United States Patent
Van Rens

(10) Patent No.: US 7,249,709 B2
(45) Date of Patent: Jul. 31, 2007

(54) HOLDER FOR PAPERS OF VALUE, AND METHOD OF REGISTERING THE CONTENTS THEREOF

(75) Inventor: Bas Jan Emile Van Rens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/507,821

(22) PCT Filed: Feb. 21, 2003

(86) PCT No.: PCT/IB03/00679

§ 371 (c)(1),
(2), (4) Date: Mar. 21, 2005

(87) PCT Pub. No.: WO03/079299

PCT Pub. Date: Sep. 25, 2003

(65) Prior Publication Data

US 2005/0156033 A1    Jul. 21, 2005

(30) Foreign Application Priority Data

Mar. 18, 2002   (EP) ................................. 02076073

(51) Int. Cl.
*G06K 7/08* (2006.01)
*G07D 11/00* (2006.01)

(52) U.S. Cl. ..................... 235/451; 235/379; 235/383

(58) Field of Classification Search ............... 235/451, 235/492, 379, 383
See application file for complete search history.

(56) References Cited

U.S. PATENT DOCUMENTS

| | | | | |
|---|---|---|---|---|
| 4,739,156 A | * | 4/1988 | Watanabe | 235/379 |
| 4,953,086 A | * | 8/1990 | Fukatsu | 705/42 |
| 5,227,966 A | * | 7/1993 | Ichiba | 705/16 |
| 5,295,196 A | * | 3/1994 | Raterman et al. | 382/135 |
| 5,370,466 A | * | 12/1994 | Kimura | 705/30 |
| 5,695,038 A | * | 12/1997 | Keith et al. | 194/206 |
| 6,547,151 B1 | * | 4/2003 | Baldi | 235/492 |
| 6,550,671 B1 | * | 4/2003 | Brown et al. | 235/379 |
| 6,843,418 B2 | * | 1/2005 | Jones et al. | 235/462.01 |
| 2003/0006121 A1 | * | 1/2003 | Lee et al. | 194/206 |
| 2005/0145696 A1 | * | 7/2005 | Ichihara | 235/440 |

FOREIGN PATENT DOCUMENTS

JP    2005146646 A   *   6/2005

* cited by examiner

*Primary Examiner*—Michael G. Lee
*Assistant Examiner*—Jamara A. Franklin
(74) *Attorney, Agent, or Firm*—Adam L. Stroud

(57) ABSTRACT

The register (1) for papers of value (4), such as bank notes and vouchers, comprises a reading unit (2) for reading out the memories of the integrated circuits (40) of the papers of value (4), and is further provided with a clock and a memory. The total value present in the register (1) can be determined by reading out all papers of value that are present at a moment, and by repeating this if desired. The register (1) may be portable, such as a wallet. The paper of value (4) with an integrated circuit (40) and antenna may also be a sales slip.

9 Claims, 2 Drawing Sheets

HOLDER FOR PAPERS OF VALUE, AND METHOD OF REGISTERING THE CONTENTS THEREOF

The invention relates to a holder for registering the contents of a holder of papers of value, which holder contains papers of value of a first type, which papers are each provided with an integrated circuit with a memory, in which memory an identification code is stored, said holder being provided with a reading unit by means of which the memory of the integrated circuit of one or several papers of value can be read out.

The invention also relates to a holder of papers of value provided with a reading unit by means of which the memory of the integrated circuit of one or several papers of value present in the holder can be read out.

The invention further relates to a system comprising a holder of papers of value and a counting unit, which holder is provided with a reading unit by means of which the memory of the integrated circuit of one or several papers of value present in the holder can be read out, said counting unit registering a product value of an incoming and/or outgoing product.

The invention further relates to a sales slip.

Such a holder is known from DE-A 19630648. The known holder is a cash register with a reading unit for transponders. Papers of value—in particular banknotes—provided with an integrated circuit (also denoted IC hereinafter) and an antenna or contact surface are in fact such transponders and may be stored in the cash register and read out. The memory of the integrated circuit contains an identification code representing the monetary value and a registration number of the banknote. This cash register is capable of electronically recognizing the value of a banknote. The registration numbers of banknotes obtained, for example, in a kidnap or a robbery may thus be quickly ascertained. It is even possible to declare the robbed banknotes invalid because it is not the banknote, but the identification code in the memory of the IC which is the ultimate mark of validity.

However, no efficient method of registering the contents of a holder of papers of value is known. Such an efficient method is necessary because otherwise the payment for bought goods, for example in a department store, will occupy too much time.

It is a first object of the invention to provide a method of the type described in the opening paragraph which can be implemented in an efficient manner and which then gives a reliable result.

It is a second object of the invention to provide a holder of the type mentioned in the second paragraph, in combination with which the method according to the invention can be implemented.

The first object is achieved in that the method comprises the steps of:
  reading the memories of the integrated circuits of the papers of value of the first type present in the holder at a registration moment, which registration moment is laid down by means of a clock present in the holder;
  determining a total value of the papers of value of the first type on the basis of the identification codes stored in the memories; and
  storing the total value in a memory of the holder.

The second object is achieved in that the holder is provided with a memory and with a clock for storing a total value of the papers of value present at consecutive registration moments.

The communication between the reading unit and the papers of value renders it possible to read out the ICs of all papers of value present at one registration moment, also if these papers of value are present in a stack. This has the advantage that the reading-out of an IC need not take place upon receipt and upon handing-out of a paper of value, which would be inconvenient in practice. A subsequent storage of the total value in the memory of the holder, preferably in conjunction with a time indication of the clock at the registration moment, makes it possible to determine the decrease or increase in the total value of the papers of value present. The decrease or increase may then be related to the exchange of goods and/or services that have taken place around the registration moment. Various methods are known to those skilled in the art for the registration of the exchange of goods and/or services, such as an electronic registration based on articles identifiable by means of bar codes, or a manual registration by means of an accounts book. The memory thus provides an overview of total values over a working period at the end of the working period. Errors in receiving or giving-out papers of value and any theft of papers of value can be spotted more easily and be linked more reliably to a certain person. The term "paper of value" in the present application is to be interpreted as denoting any substrate that represents a certain money value. Examples are banknotes, checks, vouchers, admission tickets, telephone cards, and other credit notes, in particular any type of paper known security paper. Sales slips may also be regarded as papers of value. All these papers of value are suitable for use in the method according to the invention, provided an IC with a memory and means for transmitting data and energy, such as an antenna and a contact surface, are present.

A paper of value of a first type is understood to be in particular a paper of value whose value is stored in the memory in one specific manner. This is dependent on the manner of coding; for example, there may be a specific code for a specific type of paper of value. Alternatively, each paper of value may have a unique code, and the type of the paper of value belonging to the code is found in a central database. A further possibility is that the code as a whole is indeed unique, but comprises a portion which is specific for the type of paper of value. The further, unique portion of the code may then be used for recognizing counterfeit or invalidated money or for marking specific papers of value as invalidated, for example after they have been stolen in a robbery. It is not necessary in this case for each reading unit to be capable of reading this unique portion.

The subdivision of papers of value into different types is dependent on object and design. A possibility is, for example, that all banknotes of a given value, for example 100 euros, are regarded as papers of value of the first type, and banknotes of 20 euros as papers of value of a second type. Alternatively, all banknotes in euros may be regarded as papers of value of a first type, whereas banknotes in dollars are regarded as papers of value of a second type. Furthermore, the papers of value of the first type may be banknotes and the papers of value of the second type may be different documents, such as entrance tickets to be sold. It may alternatively be that papers of value of the first type have a previously determined value and that papers of value of the second type have a variable value, such as checks. Yet another possibility is that the papers of value of the first type are provided with an IC and an antenna, whereas papers of value of the second type are not. Such papers of value may be provided with an antenna and a passive identification mark.

Examples of holders of papers of value are cash registers, wallets, money cassettes, ATM machines, and safe-deposit boxes.

In the most common cases, the holders will contain not only papers of value but also coins. A weighing unit may be present, if so desired, for determining the quantity of coins in the holder. The coins may then be regarded as "papers of value" of a third type. Furthermore, an identification mark may also be provided on coins, for example a coating of magnetic material.

An alternative is that an algorithm is performed for the reception and giving-out of coins. This is possible in particular if the decrease or increase in the cash balance is registered separately by means of a counting unit. For example, if an amount of 9.03 euro is to be paid, and a banknote of 10 euros is added to the cash register, it can be detected that the total value of the coins has decreased by 0.97 euro. If payment is made with a banknote of 20 euros, and a banknote of 5 euros plus coins is returned, it can be detected that the total value of the coins has decreased by 5.97 euros. This may be repeated at every transaction. It is accordingly known at any given moment what the total value of the coins should be. It may even be derived from this total value with a certain accuracy how many coins of, for example, 1 euro, should be present.

The registration moments for reading out the ICs of the papers of value in the cash register may be chosen more exactly. There may be a certain time interval maintained between a first and a second registration moment. Alternatively, the registration moment may be coupled to the operation of a certain key on the holder. In a favorable modification of the holder according to the invention, a light sensor is present in the holder, which light sensor determines a moment for reading out the papers of value present in the holder. The light sensor in addition may ensure that the papers of value are read out exclusively at a moment when the holder is closed (so no papers of value are being added or taken away).

The communication between the reading unit and the papers of value may take place in a contactless manner, or alternatively via ohmic contacts or alternative means for transmitting data and energy. If there is communication via ohmic contacts, said means will be electrodes at the surface of the paper of value, preferably in the same location on all papers of value. It is ensured in this manner that signals between a reading unit and a first individual paper of value can be transmitted via a second individual paper of value.

The communication between the paper of value and the reading unit of the holder, however, preferably takes place in a contactless manner, and more preferably by capacitive or inductive coupling. Other forms of communication are also possible, provided a first individual paper of value does not or substantially not interfere with the signal between the reading unit and a second individual paper of value. An example is communication by means of infrared radiation. Contactless communication has the advantage over contact communication that the detection of a paper of value cannot be disturbed by the removal of contacts or pollution of contacts. In the case of contactless coupling, the means for transmitting data and energy are constructed as an antenna. The antenna of the paper of value preferably covers a substantial portion of the surface area of the paper in the case of capacitive coupling, so as to increase the coupled capacitance. The communication will take place at a comparatively low frequency, while the reading unit must use a comparatively high power. If not, it would appear to be impossible to identify the number of papers of value present correctly, especially if this number is of the order of 50 to 100. It is accordingly preferred to use inductive coupling for the wireless communication at a high frequency, preferably of the order of 0.1 GHz or higher. It is also possible to use inductive coupling at lower frequencies, but this has the disadvantage of a comparatively large and thick antenna.

The method and the holder according to the invention may be implemented in various alternative embodiments. A first embodiment relates to a money cassette, which also includes a wallet. Such money cassettes are essentially portable holders. They are entrusted for some time to an employee who is charged with spending and receiving often comparatively large sums. Examples are commercial travelers, waiters in a pavement cafe, and deliverers of goods which are to be paid in cash upon delivery. The use of the method according to the invention renders it possible to balance the account electronically after working hours. The holder may for this purpose be provided with an antenna for wireless transmission of the data in the memory to a central cash register, or alternatively a terminal for a contact wire to the central cash register, to a printer, etc. An added advantage of this is that the financial administration is simplified.

A second embodiment relates to a holder according to the invention which is also provided with a counting unit which registers a product value of an incoming and/or outgoing product. Such a holder may carry out the following steps:

determining a sales total as a sum of the product values registered from a start moment up to a comparison moment;

determining the cash balance as a sum of the total values of the papers of value at a moment;

determining a cash balance change as a difference between the cash balances at the comparison moment and the start moment;

determining a cash balance difference as a difference between the cash balance change and the sales total, and storing the cash balance difference in the memory of the holder.

This embodiment comprises a double-entry bookkeeping for the holder: not only are the amounts received and returned registered, but also the total value. Such a modification may be implemented, for example, in a cash register of a supermarket or department store. The double-entry bookkeeping is a precaution against errors and theft. This precaution is justified because of the large number of products and the resulting high cash balances that are processed in such a cash register. It is possible that the comparison is not made in the holder but in a separate comparison unit. This situation is discussed further below with reference to the system.

It is a third object of the invention to provide a system of the type mentioned in the introduction by means of which a suspect input or output of papers of value can be traced.

This third object is achieved in that:

a cash balance being the total value of the papers of value present can be determined by the reading unit of the holder, the holder is provided with a memory and with a clock for storing the cash balance of a given moment;

and a comparison unit which, at a comparison moment, compares a sum of the product values with a difference between the cash balance at said comparison moment and the cash balance at a start moment.

The system according to the invention performs a double-entry bookkeeping for the holder in an electronic manner. This is achieved in that the cash balance is determined, and the sum of the product values is compared with this cash balance. The comparison unit is, for example, an external computer. The system according to the invention renders it possible not only to trace errors and theft of papers of value in a simple manner. The system is also highly suitable for maintaining a good accounting regarding various transactions taking place outside the office or house. The system may thus be used in company surroundings, but also for personal purposes.

It is highly advantageous, in particular for registration of various transactions taking place outside the office or house, if the result of a transaction can be input into the holder.

It is accordingly a fourth object of the invention to provide a sales slip whose value is electronically laid down.

This fourth object is achieved in that the sales slip is provided with an integrated circuit with a memory and an antenna, a value of the sales slip being stored in said memory. The sales slip according to the invention has thus become a paper of value. This paper of value may be electronically read in the holder. When a person goes on a journey and receives, for example, 500 euros for expenses, he or she will be given a sales slip according to the invention for each expense. It is possible to detect immediately by means of the holder according to the invention whether the cash balance of banknotes plus sales slips corresponds to the original balance of 500 euros.

A further possibility is that the sales slip according to the invention is entered into a system in which accounting takes place. Furthermore, the memory of an IC of such a sales slip may contain various data which can be read by a user at a different moment and in a different location. Examples are warranty conditions, additional advertising, or references to an Internet page. It is favorable when the IC and the antenna in the sales slip according to the invention are of a flexible construction such as may be realized, for example, with the use of the substrate with IC and antenna described in WO-A 99/54842.

These and other aspects of the method, the holder, the system, and the sales slip according to the invention will be explained in more detail with reference to the appended Figures, in which:

FIG. 1 diagrammatically shows the holder with a reading unit and paper of value;

Figure 1:
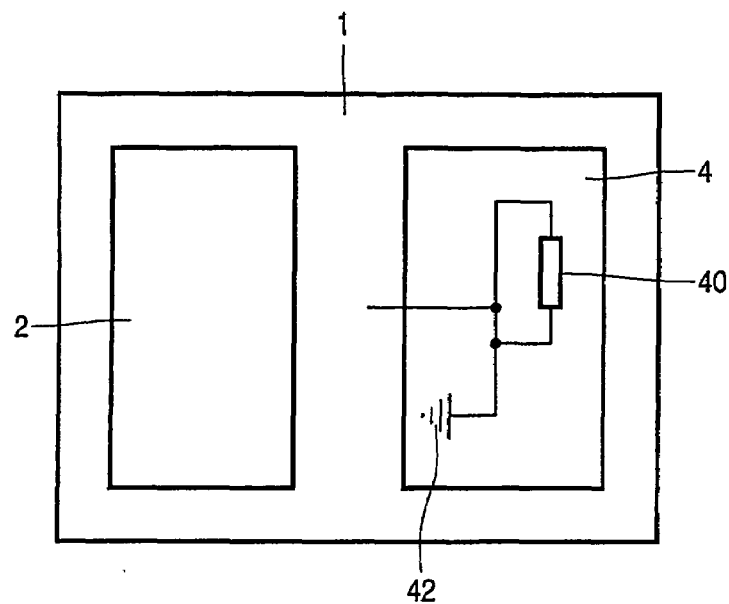
Figure 2:
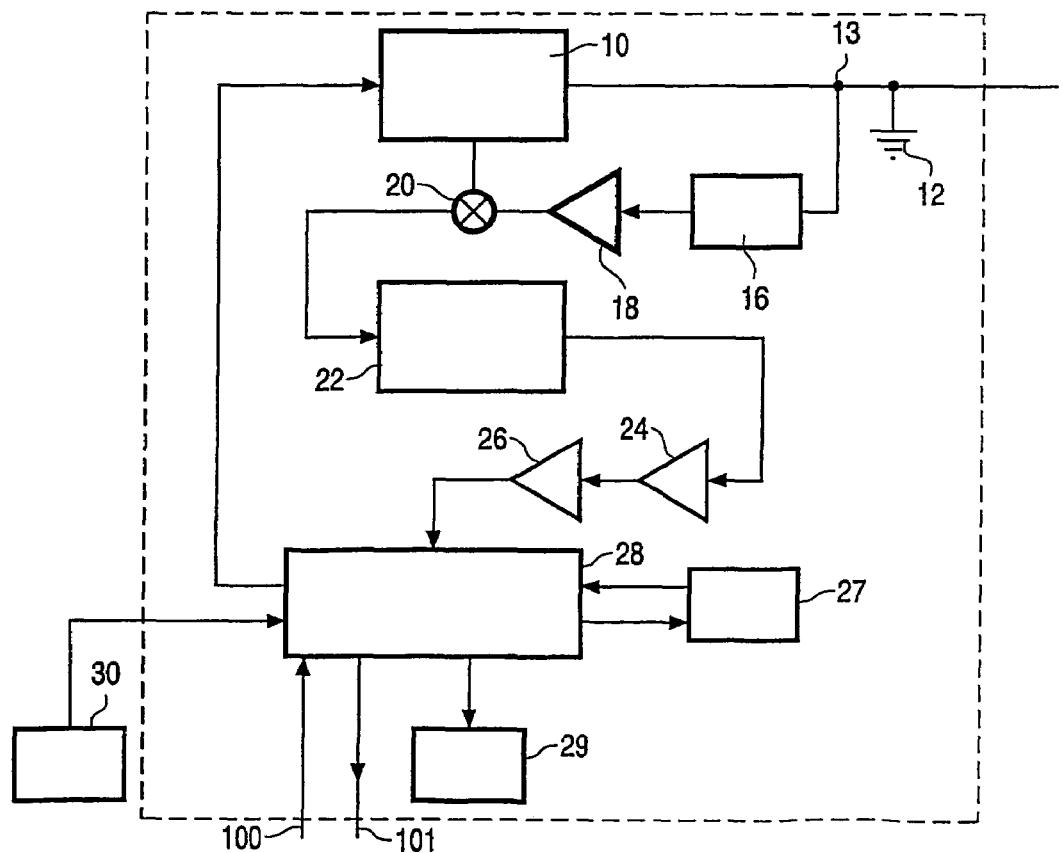
FIG. 2 is a simplified circuit diagram of the reading unit.
Figure 3:
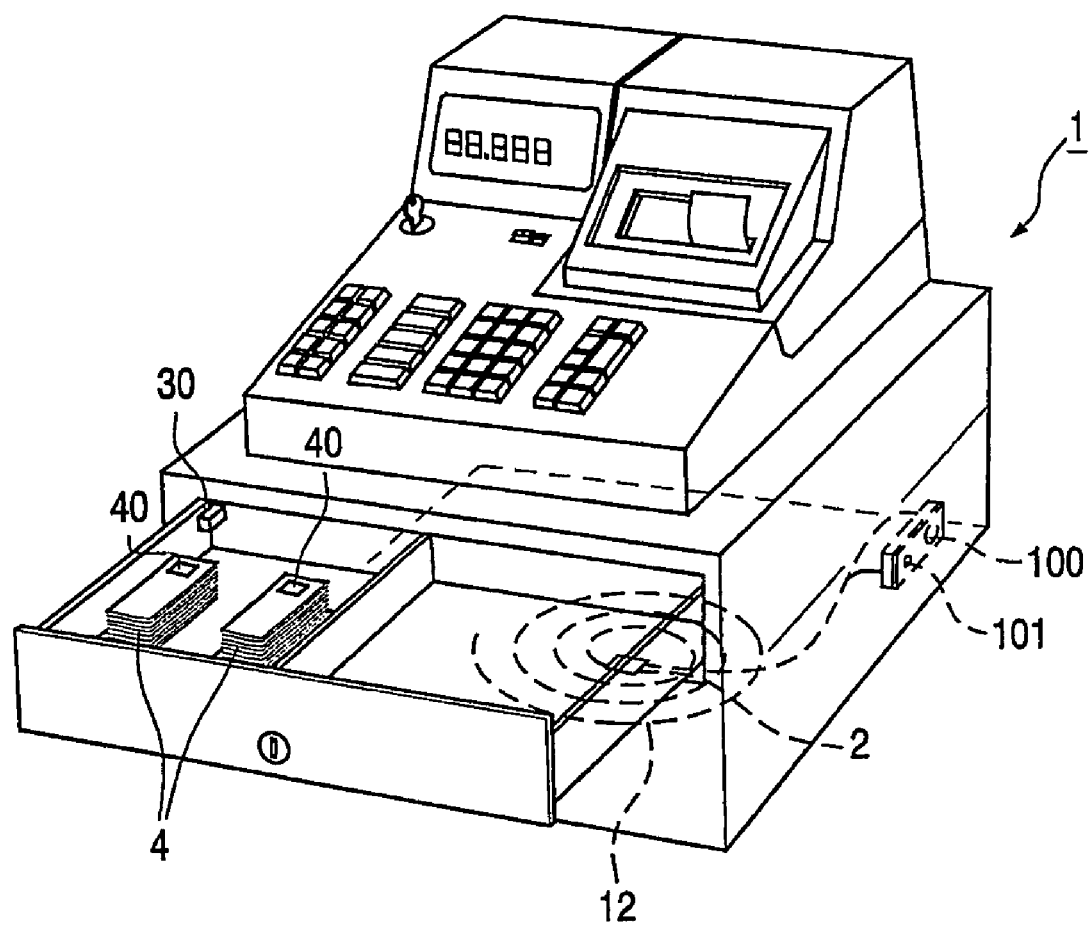
FIG. 3 is a diagrammatic drawing of the holder.

FIG. 1 diagrammatically shows a holder 1 with a reading unit 2 which exchanges data and energy with a paper of value 4 which is provided with an integrated circuit and an antenna. FIG. 2 is a simplified circuit diagram showing the reading unit 2 in more detail. FIG. 3 is a diagrammatic drawing of the holder according to the invention. Identical components have been given the same reference numerals in the Figures. The Figures merely represent examples of embodiments, as will be clear to those skilled in the art.

During operation, the holder 1 contains a stack of, for example, 5 to 50 banknotes or papers of value 4 of a first and possibly a second and a further type. Only one item, i.e. paper of value 4 is shown in FIG. 1 for the sake of clarity. The paper of value 4 comprises an integrated circuit 40 and an antenna 42. The integrated circuit 40 and the antenna 42 form part of a circuit such as is known for a transponder. Examples of such circuits are known from, for example, U.S. Pat. No. 5,537,105 for inductive coupling and U.S. Pat. No. 6,133,835 for capacitive coupling.

The holder 1 in this example comprises a reading unit 2 suitable for inductive coupling. This reading unit 2 comprises a transmitter 10 which emits a scan signal with a frequency of 915 MHz at a power of approximately 15 W through an antenna 12. The antenna 12 lies in a plane substantially parallel to the papers of value 4 during their storage in the holder 1 so as to safeguard a good signal transmission. A simple manner of communication between papers of value 4 and the reading unit 2 is described below. Alternatively, more complicated protocols may be used for the communication such as, for example, the standards ISO14.443 (Hitag) and ISO15.693. A further possibility is that more data are transmitted from the individual paper of value 4 to the reading unit in addition to the type and/or value of the relevant paper. An example is a unique identification code of the paper, by means of which the genuineness and validity of the paper can be tested.

The paper of value 4 receives the scan signal and replies with a much weaker response signal at the same frequency. The response signal is modulated with an identification code of the paper 4. It is transmitted with a random or pseudo-random delay so that it can be distinguished from response signals from other papers of value. The response signal is subsequently received by the antenna 12 of the reading unit 2. Instead of the antenna 12, which is capable of sending and receiving in conjunction with a switch 13, a pair formed by a transmission antenna and a reception antenna may be used. After reception, the response signal is passed on through a directional coupler 16, which attenuates very strong signals, to an amplifier 18. Then the response signal goes to a mixer 20. The amplified response signal is mixed with a reference value of the transmitter 10. The resulting low-frequency output goes through a bandpass filter 22 to an amplifier 24 and a comparator 26. The comparator 26 digitizes the amplified output. A microprocessor 28 analyzes the digitized response signal and tests its validity, and then stores the value of the detected paper of value.

The validity of the response signal is tested so as to identify response signals from various papers of value 4 which may arrive simultaneously at the reading unit 2 in spite of the delay used. Since the scan signals are codes of a given length provided with error correction bits, the reading unit 2 can affirm whether or not it has received a valid scan signal.

If a response signal was found to be valid, a signal is given to the transmitter so that the latter stops sending the relevant scan signal for a short period, for example 1 millisecond. This interruption will be detected by the paper of value 4 and may be used as a stop signal by which the transmission of the response signal is terminated. The result of this is that more time remains for other individual papers of value 4 to send response signals to the reading unit 2.

After recognition of the validity of the response signal, the value and/or type of the detected paper is stored in a volatile memory. The value and/or type is incorporated in the paper of value 4 as part of its identification code. This code may be specific for a paper of value of a certain value and/or type, or may alternatively comprise a portion which is specific for the value and/or type of the paper and may for the rest be unique. The addition of a unique portion to the code renders it possible to trace the movements of individual papers of value. The microprocessor 28 of the reading unit 2 is thus capable of counting how many banknotes of a certain value or of a certain type are present. The type of paper 4 may be, for example, a certain currency, voucher, check, bill, etc. When the reading unit receives no more response signals, all papers present have been identified. The total value of the papers of value 4 is then stored, preferably in combination with a time indicator. The time indicator is generated by a clock 27. This storage takes place in a memory 29 in the holder 1. In this example the memory 29 is present in the reading unit 2. The form in which the total value is stored may vary, but preferably the number of items of each type and/or value is registered for the papers of value 4. In addition, one or several signals representing the total number of individual papers of value 4 of each type and/or value may be sent to a memory outside the holder 1. Storing and/or transmitting takes place in a conventional manner and may also be implemented in a manner different from that in the present example.

Certain algorithms may be performed already before storage and/or transmission. The object of this may be inter alia that as few as possible data need be transmitted. Another object is that alternative desired values are calculated. Such a desired value is, for example, the intermediate value equal to the difference between the total value at the registration moment and the total value at a first moment preceding the registration moment.

It will be clear to those skilled in the art that a major portion of the scan signal is received again. To prevent pollution of the result, a bandpass filter 22 is present for removing the scan signal.

A clock 27 is present in the holder 1, preferably in the reading unit 2, for defining the time indication. The clock 27 may show the time in days, hours, and minutes. Alternatively, the clock may simply be a counter for the number of times the value of the holder has been determined. It will be obvious to those skilled in the art that a wide variety of possibilities exists for implementing the clock 27.

The reading unit 2 shown in FIG. 2 obviously has an input 100 and an output 101 to further equipment. Such an input 100 and output 101 may be implemented in a wireless manner or by means of cables. The reading unit 2 further comprises an input from a photosensor 30. This photosensor 30 present in the holder 1 triggers the moment when the contents of the holder are determined. It is alternatively possible that this moment is determined on the basis of data put in through the input 100, or that this moment is generated by the clock 27.

The invention claimed is:

1. A method of registering contents of a holder of papers of value, said holder being for holding papers of value of a first type, said papers of value are each provided with an integrated circuit with a memory for storing an identification code, said holder of papers of value comprising:
   a reading unit for reading the memory of the integrated circuit of one or several papers of value,
   a memory, and
   a clock,
   said method comprises:
   reading the memories of the integrated circuits of the papers of value of the first type present in the holder at a registration moment;
   providing an interrupt signal to each integrated circuit of each paper of value after reading each integrated circuit of each paper of value, said interrupt signal is for use by an integrated circuit in a paper of value for stopping a transmission to said reading unit for a predetermined amount of time.
   determining a total value of the papers of value of the first type on the basis of the identification codes stored in the memories of said integrated circuits;
   storing the total value in the memory of the holder.

2. A method as claimed in claim 1, wherein the total value is stored in combination with a time indication of the clock at the registration moment.

3. A method as claimed in claim 1, wherein the holder further contains papers of value of a second type, said papers of value of the second type are provided with an integrated circuit comprising a memory wherein an identification code is stored,
   said method further comprises:
   reading the memory of the integrated circuit of the papers of value of the second type present in the holder at the registration moment;
   providing a second interrupt signal to a paper of value of the second type after reading the memory of the integrated circuit of the paper of value the second type, said second interrupt signal is for requesting that said integrated circuit of the paper of value of the second type stop providing a signal to be read;
   determining a second total value of the papers of value of the second type on the basis of the identification codes stored in the memories of the integrated circuits of the papers of value of the second type; and
   storing the second total value in the memory of the holder.

4. A method as claimed in claim 1, wherein the holder is also suitable for containing coins, said method further comprising:
   weighing the coins;
   determining a third total value of the coins; and
   storing said third total value in the memory of the holder.

5. A method as claimed in claim 1, wherein the holder is further provided with a counter which registers a net sales value of products being sold or purchased, comprising:
   a sales total is determined as the sum of the product values registered from a start moment up to a comparison moment;
   a cash balance change is determined as a difference between the cash balances at the comparison moment and the start moment;
   a balance difference is determined as the difference between the cash balance change and the sales total; and
   the balance difference is stored in the memory of the holder.

6. A holder as claimed in claim 1, wherein the holder further comprises a photosensor for determining a moment for reading the papers of value present in the holder.

7. A holder of papers of value comprising:
   a reading unit for receiving a response signal containing information from a memory of an integrated circuit of one or several of the papers of value present in the holder, each said memory of the integrated circuits contain a value for each of said one or several papers of value; said reading unit being further for providing an interrupt signal to each integrated circuit of said one or several papers of value after each information from each said memory of said integrated circuit of said one or several papers of value is read and validated by said reading unit;
   a clock and a memory, in the holder, for storing a time indication and a total value of the papers of value present at consecutive registration moments; and
   a processor for calculating an amount of value received by said holder of papers of value, an amount of value taken out of said holder of said papers of value, and also a total value of said papers of value in said holder at a selected time indication.

8. A holder as claimed in claim 7, wherein the holder is a money cassette.

9. A system comprising:

a holder for papers of value comprising:

a reading unit for sending a wireless read signal and for receiving data from each memory of an integrated circuit of one or several papers of value present in the holder; said reading unit being further for providing an interrupt signal to at least one of the integrated circuits of the one or several papers of value after a valid data signal is received from the at least one integrated circuit; and for determining a cash balance, being the total value of the papers of value present;

a clock and a memory for storing said cash balance and a time indicator at a moment;

a counter which increments by a predetermined amount each time said cash balance is stored in said memory; and a comparator which, at a comparison moment, compares a previous cash balance with a present cash balance and provides a difference between the previous and present cash balances at said comparison moment.

* * * * *